Patented May 6, 1952

2,595,779

UNITED STATES PATENT OFFICE 2,595,779

COPOLYMERS OF HALOGENATED UNSATURATED POLYCARBOXYLIC ACIDS AND POLYUNSATURATED COMPOUNDS

James R. Dudley, Darien, Conn., assignor to American Cyanamid Company, New York, N. Y., a corporation of Maine No Drawing. Application April 3, 1948, Serial No. 18,855

2 Claims. (Cl. 260—78.5)

This invention relates to cation exchange materials, a method of manufacturing cation exchange materials, and the use of cation exchange materials for the removal of cations from, or the exchange of cations in, liquid media. More particularly, the invention relates to new granular, water-insoluble, synthetic cation exchange resins active for the removal of cations from solution.

It is an object of the present invention to provide a new synthetic cation exchange resin active for the removal of cations from solution.

It is another object of the present invention to provide a process for the preparation of new synthetic cation exchange resins active for the removal of cations from solution.

A further object of the present invention is a process for the purification of liquids by means of new granular, water-insoluble, synthetic cation exchange resins active for the removal of cations from solution.

The above and other objects are attained by the preparation of a copolymer of (1) an aliphatic polycarboxylic acid which contains at least one alpha - halo - alpha - unsaturated - alpha,beta-dicarboxyl group, or a substance hydrolyzable thereto, and (2) a polymerizable polyunsaturated organic material, and the application of said copolymer or hydrolyzed copolymer, respectively, in granular form to the purification of liquids and more particularly, of aqueous solutions.

The invention will be described in greater detail in conjunction with the following specific examples in which proportions are given in parts by weight. The examples are merely illustrative, and it is not intended that the scope of the invention be restricted to the details therein set forth.

Example 1

132.5 parts of chloromaleic anhydride (1.0 mol)
46.2 parts of N,N-methylenediacrylamide (0.3 mol)
375.0 parts of water
3.0 parts of hydrogen peroxide, 30%

The chloromaleic anhydride and methylenediacrylamide are dissolved in the water by heating to 80° C. The solution is cooled to 40° C., and the hydrogen peroxide is added. The reaction mixture is then heated and when the temperature reaches 80° C., gelation occurs. The opaque gel formed is granulated and cured by heating for 16 hours at 90° C.

The cured resin obtained is activated with hydrochloric acid and portions thereof then exhausted to both sodium hydroxide and sodium bicarbonate solutions. The resin, which has a density of about 11 lbs. per cubic foot, has a capacity for the removal of sodium from sodium hydroxide solution of about 9.8 kilograins as calcium carbonate per cubic foot of resin, and a capacity for the removal of sodium from sodium bicarbonate solution of about 3.6 kilograins as calcium carbonate per cubic foot of resin.

Example 2

132.5 parts of chloromaleic anhydride (1.0 mol)
77.0 parts of N,N'-methylenediacrylamide (0.5 mol)
390.0 parts of water
4.7 parts of hydrogen peroxide, 30%

The procedure of Example 1 is followed. The resin obtained, which has a density of about 16 lbs. per cubic foot, has a capacity for removing sodium from sodium hydroxide solution of about 9.0 kilograins as calcium carbonate per cubic foot of resin, and a capacity for the removal of sodium from sodium bicarbonate solution of about 3.8 kilograins as calcium carbonate per cubic foot of resin.

Example 3

132.5 parts of chloromaleic anhydride (1.0 mol)
77.0 parts of acrylamide (1.08 mols)
40.5 parts of formaldehyde, 37% (0.5 mol)
390.0 parts of water
4.7 parts of hydrogen peroxide, 30%

N,N'-methylenediacrylamide is formed in situ in this preparation. The chloromaleic anhydride, acrylamide, formaldehyde, and water are mixed and the mixture is heated to 50° C. After the mixture is heated for 15 minutes at 50° C., the hydrogen peroxide is added and heating is continued. Gelation occurs in about 9 minutes and the rigid opaque gel obtained in granulated and cured by heating for 16 hours at 90° C.

The resin obtained has a capacity for the removal of sodium from sodium hydroxide solution of about 10.6 kilograins as calcium carbonate per cubic foot of resin, and a capacity for the removal of sodium from sodium bicarbonate solution of about 3.7 kilograins as calcium carbonate per cubic foot of resin.

The N,N'-methylenediacrylamide used in Examples 1 and 2 may be prepared in accordance with the disclosure of the copending application of Lennart A. Lundberg, Serial No. 707,040 filed October 31, 1946, now U. S. Patent 2,475,846, as follows:

199 parts of acrylamide (2.8 mols)
113 parts of formaldehyde (1.4 mols)
2 parts of cupric acetate
150 parts of water
47 parts of concentrated hydrochloric acid, 37%

To a well agitated mixture of the acrylamide, formaldehyde, cupric acetate and water is added the hydrochloric acid. An exothermic reaction occurs, and after it has subsided the mixture is heated for ½ hour. A white crystalline solid separates on cooling and is recovered by filtration. This material, which represents a 50% yield of N,N'-methylenediacrylamide based on the theoretical, is recrystallized from ethanol. The pure product is found to have a melting point of 185°–186° C. and the following analysis:

|          | Calculated for $C_7H_{10}O_2N_2$ Per cent | Found Per cent |
|----------|-------------------------------------------|----------------|
| Carbon   | 54.53                                     | 54.61 / 54.48  |
| Hydrogen | 6.53                                      | 6.34 / 6.42    |
| Nitrogen | 18.18                                     | 18.09 / 18.15  |

The present invention is in no sense limited to the use of chloromaleic anhydride as one of the principal resin-forming ingredients. Any aliphatic polycarboxylic acid which contains an alpha - halo - alpha - unsaturated - alpha,beta-dicarboxyl group, i. e.,

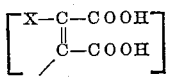

in which X is a halogen atom, falls within the scope of my invention. Also included are substances which are so related to the unsaturated polycarboxylic acids to be hydrolyzable thereto, for example, the salts, esters, anhydrides, amides, etc., of the unsaturated polycarboxylic acids. While all aliphatic polycarboxylic acids which contain an alpha-halo-alpha-unsaturated-alpha,beta-dicarboxyl group are suitable for use in the preparation of the copolymers of the present invention, it will be immediately apparent that, from the practical standpoint, the preferred acids are the alpha-halo-alpha-unsaturated-alpha,beta-dicarboxylic acids because they are most readily available. Thus, I may use in the process of the present invention chloro-, bromo-, fluoro-, and iodomaleic and fumaric acids, as well as the corresponding halogenated derivatives of monoalkyl-substituted maleic and fumaric acids, i. e., mesaconic acid, monoethyl fumaric acid, monoisobutyl fumaric acid, monooctyl fumaric acid, citraconic acid, monoethyl maleic acid, monoamyl maleic acid, 2-ethylhexyl-maleic acid, etc. Dihalogenated derivatives of maleic and fumaric acids such as dichloromaleic acid, dichlorofumaric acid, dibromomaleic acid, chlorobromofumaric acid, and the like, may also be used.

While the alpha,beta-unsaturated dicarboxylic acids are the most practicable for use in the process of the present invention, I may also use alpha-halogenated derivatives of alpha,beta-unsaturated polycarboxylic acids as Aconitic acid

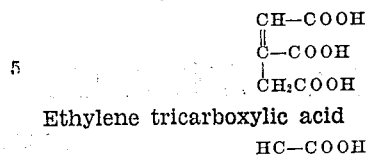

Ethylene tricarboxylic acid

Alpha - amylene - alpha,beta,gamma,gamma, epsilon-pentacarboxylic acid

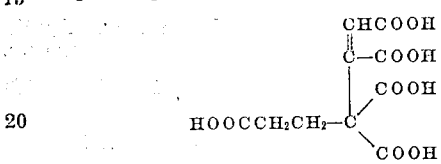

and the like.

Instead of acids of the type disclosed above as suitable for use in the present invention, derivatives thereof which are hydrolyzable to the acids may be copolymerized with a polyunsaturated material and the copolymer then hydrolyzed in order to provide free carboxyl groups for the cation exchange resin. Alkali metal salts of the polycarboxylic acids may be used. Similarly operative are the polycarboxylic acid chlorides, anhydrides, amides, and alkyl, aryl, and aralkyl esters. Taking chloromaleic acid as a typical example of an activated unsaturated polycarboxylic acid adapted for use in the present invention, I may therefore use in place of the acid itself chloromaleic acid chloride, chloromaleic anhydride, chloromaleic monoamide and diamide, sodium or potassium chloromaleate, alkyl esters of chloromaleic acid such as monomethyl chloromaleate, dimethyl chloromaleate, monoethyl chloromaleate, diisobutyl chloromaleate, monoamyl chloromaleate, diamyl chloromaleate, 2-ethylhexyl chloromaleate, methylethyl chloromaleate, etc.; aryl esters of chloromaleic acid such as monophenyl chloromaleate, diphenyl chloromaleate, mononaphthyl chloromaleate, etc.; aralkyl esters of chloromaleic acid such as monobenzyl chloromaleate, dibenzyl chloromaleate; substituted chloromaleic acid amides of the formula

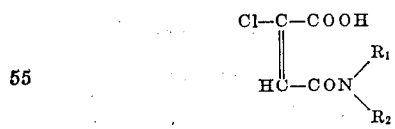

in which $R_1$ is hydrogen, alkyl, aryl, or aralkyl, and $R_2$ is alkyl, aryl, or aralkyl or

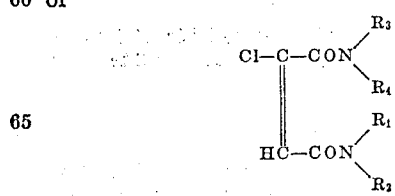

in which $R_1$ may be hydrogen, alkyl, aryl, or aralkyl, and $R_2$, $R_3$, and $R_4$ are alkyl, aryl, or aralkyl examples of such amides being N-methylchloromaleic monoamide, N,N - diethylchloromaleic monoamide, N-methyl-N'-ethylchloromaleic diamide, N-phenylchloromaleic diamide, N,N'-dibenzylchloromaleic diamide, and the like.

Chloromaleic acid imide may also be used. It should be borne in mind that chloromaleic acid has been taken as a representative example and similar derivatives of other aliphatic unsaturated polycarboxylic acids suitable for the preparation of my new cation exchange resins may be used. Moreover, it is obvious that mixtures of any number of such polycarboxylic acids or hydrolyzable derivatives thereof may be copolymerized with a polyunsaturated material in accordance with the present invention.

If a hydrolyzable derivative of a suitable aliphatic unsaturated polycarboxylic acid is used in the preparation of my new resins, the resinous product obtained may be readily hydrolyzed to the free acid, preferably by boiling with water or acid.

Cation exchange resins may also be prepared by copolymerization of a polyunsaturated material having at least two ethylenic double bonds and no aliphatic conjugated carbon-to-carbon double bonds such as those described below with other halogenated unsaturated polycarboxylic acids and substances which are hydrolyzable thereto. Some examples of such acids are Chloroitaconic acid $$CH_2=C-COOH$$
$$CHClCOOH$$

Alpha-alkylchloroitaconic acids such as alpha-methylchloroitaconic acid $$CH_2=C-COOH$$
$$Cl-C-COOH$$
$$CH_3$$

Chloroglutaconic acid $$Cl-C-COOH$$
$$CHCH_2COOH$$

Monochloromuconic acid $$CH=CHCOOH$$
$$CH=CClCOOH$$

Dichloromuconic acid $$CH=CClCOOH$$
$$CH=CClCOOH$$

Alpha,beta-dihydro-delta-chloromuconic acid $$CH=CClCOOH$$
$$CH_2CH_2COOH$$

Alpha-methyl-gamma-chloroglutaconic acid $$CH_3CHCOOH$$
$$CH=CClCOOH$$

Dihydrochloropiperylene dicarboxylic acid $$CH_2CH=CClCOOH$$
$$CH_2CH_2COOH$$

1-chloropentene-4-dicarboxylic acid-1,4

$$CH_2CHClCOOH$$
$$CH_2C=CH_2$$
$$COOH$$

2,3-dichloropentene-1-dicarboxylic acid-3,5

$$CH_2=CCl-CCl-CH_2CH_2COOH$$
$$COOH$$

Alpha,alpha - dimethyl - gamma - chloroglutaconic acid $$(CH_3)_2C-CH=CClCOOH$$
$$COOH$$

1-chlorobutene-1-tricarboxylic acid-1,3,4

$$CH=CClCOOH$$
$$CHCOOH$$
$$CH_2COOH$$

etc. Obviously, the corresponding bromo-, fluoro-, and iodo- derivatives are also useful.

The present invention is in no sense limited to the use of N,N'-methylenediacrylamide as one of the principal resin-forming ingredients, and any of the diacrylamides disclosed in the copending Lundberg application referred to above may be substituted therefor. These diacrylamides may be represented by the following general formula:

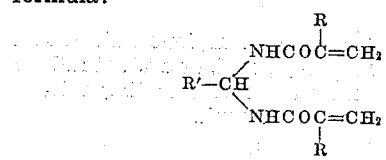

where

is the hydrocarbon residue of a saturated or unsaturated aliphatic aldehyde, an aromatic aldehyde, or a heterocyclic aldehyde, and R is either hydrogen or a hydrocarbon radical, i. e., alkyl, aryl, or aralkyl. Specifically may be mentioned:

N,N'-methylenedimethacrylamide

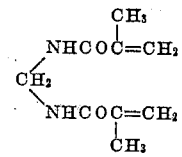

N,N'-ethylidenediacrylamide

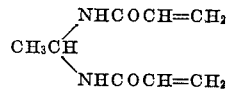

N,N'-crotylidenediacrylamide

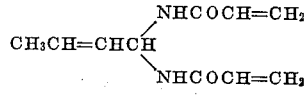

N,N'-benzylidenedimethacrylamide

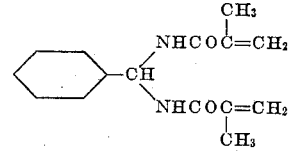

N,N'-furfurylidenediacrylamide

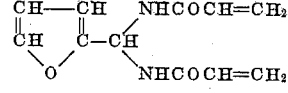

N,N'-methylenediphenacrylamide

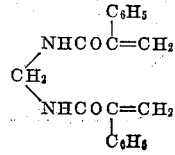

N,N'-methylenedibenzacrylamide

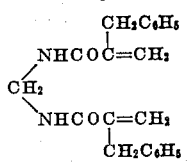

and the like.

Similar compounds of the formula

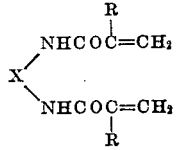

wherein X is an alkylene or arylene radical and R is hydrogen or an alkyl, aryl, or aralkyl radical may be used, as may the corresponding sulfonamide derivatives of the formula

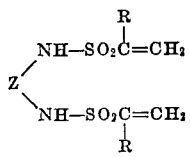

in which Z is alkylene or arylene or the hydrocarbon residue of a saturated or unsaturated aliphatic aldehyde, an aromatic aldehyde or a heterocyclic aldehyde, and R is either hydrogen or a hydrocarbon radical as in the foregoing formulae. Thus, specifically, I may use:

1,2-diacrylamidobenzene

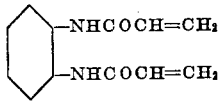

1,3-dimethacrylamidopropane

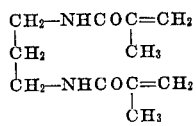

1,2-dibenzacrylamidoethane

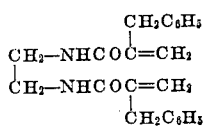

1,3-diphenacrylamidobenzene

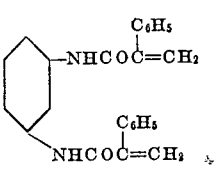

Diethylenesulfonamidomethane

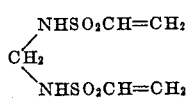

1,2-diethylenesulfonamidobenzene

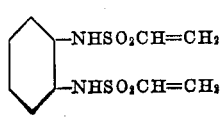

1,2 - di(alpha - methylethylenesulfonamido)-ethylene

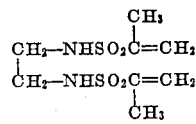

N,N'-ethylidenediethylenesulfonamido

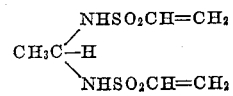

N,N'-benzylidenediethylenesulfonamide

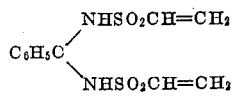

N,N'-furfurylidenediethylenesulfonamide

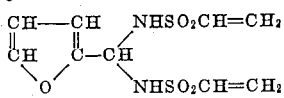

and the like.

Moreover, any polymerizable material containing more than one ethylenic-type double bond but no conjugated aliphatic carbon-to-carbon double bonds may be substituted for the diacrylamides and disulfonamides described above. I prefer those materials which contain a plurality of $CH_2=C<$ groups as the ethylenic linkages, but the invention is not so limited. Examples of suitable polyunsaturated materials include divinyl ether, divinyl sulfone, allyl ethers of polyhydric compounds such as glycerol, pentaerythritol, resorcinol, etc., divinylbenzene, divinylketone, divinylsulfide, polydienes such as polybutadiene, polychloroprene, polyisoprene, etc., polyfumaramide, allyl acrylate, and the like. Polyesters of allyl alcohol, 2-methallyl alcohol, 2-chloroallyl alcohol, etc., with polybasic acids, both organic and inorganic, may also be copolymerized with unsaturated polycarboxylic acids according to the present invention. For example, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicone, diallyl silicate, triallyl tricarballylate, triallyl aconitate, triallyl citrate, triallyl phosphate, and the corresponding substituted allyl esters, are suitable.

It is essential that the material to be copolymerized with an unsaturated polycarboxylic acid according to the process of the present invention be polyunsaturated, i. e., contain a plurality of ethylenic double bonds, preferably $CH_2=C<$ groups, and have no conjugated aliphatic carbon-to-carbon double bonds. Thus, while the material must have at least two ethylenic double bonds, it may have three, four, six, eighteen, one hundred, or an infinite number of such linkages.

The copolymerization reaction which results in the production of the new cation exchange resins of the present invention is preferably carried out in the presence of a polymerization catalyst. Suitable catalysts include hydrogen peroxide; the acidic peroxides as, for example, benzoyl peroxide, phthalic peroxide, succinic peroxide, and benzoyl acetic peroxide; fatty acid peroxides as, for example, cocoanut oil acid peroxides, lauric peroxide, stearic peroxide, and oleic peroxide; alcohol peroxides as, for example, tert.butyl hydroperoxide, ditert.butyl peroxide; terpene oxides as, for example, ascaridole; and the like. Other polymerization catalyst which may be used include alkali metal persulfates, azo compounds as, for example, alpha,alpha'-azoisobutyronitrile ("Porophor N"), soluble cobalt salts, i. e., cobalt linoleate and cobalt naphthenate, p-toluene sulfonic acid, p-toluene sulfonamide, aluminum chloride, stannic chloride, boron trifluoride, etc. The term "polymerization catalyst" as used is not intended to cover oxygen contained in the resin as an impurity.

The concentration of catalyst employed is usually small and generally ranges from about 1 part catalyst per 1000 parts of copolymerizable mixture to about 2 parts catalyst per 100 parts of the copolymerizable mixture. If an inhibitor be present, however, up to 5% or more of the catalyst may be necessary.

Choice of a catalyst in any particular case depends upon the desired result. For example, the peroxide catalysts are generally preferred and they accelerate copolymerization across the double bonds of the copolymerizable materials. If, however, the polyunsaturated copolymerizable material is an aromatic compound and an acid catalyst such as, for example, aluminum chloride, boron trifluoride or the like is selected, some or all of the copolymerization may take place by alkylation of the aromatic nucleus. This alkylation-type polymerization is generally to be avoided, if possible, in the present invention, but if it does take place to some extent it need not adversely affect the utility of my new products for ion exchange operations.

It is sometimes advisable to incorporate in the copolymerization mixture of the present invention a small proportion of a polymerization inhibitor in order to avoid polymerization thereof on storage. When polymerization is desired, enough catalyst is added to overcome the effect of the inhibitor and to promote the reaction.

Suitable polymerization inhibitors for this reaction include phenolic compounds, especially the polyhydric alcohols, aromatic amines, aldehydes, sulfur compounds, and the like. Examples of some inhibitors are hydroquinone, benzaldehyde, ascorbic acid, isoascorbic acid, resorcinol, tert.butyl catechol, tannin, sym.di-beta-naphthyl-p-phenylenediamine, phenolic resins, etc.

The concentration of inhibitor is preferably low, and I have found that less than about 1% is usually sufficient. With the preferred inhibitors, I need use only about 0.01% to about 0.1%.

Some substances which normally exhibit an inhibiting effect on polymerization may, under certain circumstances, promote polymerization. Since an oxidation-reduction system is apparently involved in such cases of polymerization and the peroxide type of catalyst is generally preferred for the preparation of my cation active resins, I find the Redox peroxide-bisulfite system particularly useful.

Polymerization may be effected by means of heat, light, or a combination of the two. Ultraviolet light is more effective in this respect than ordinary light. In general, polymerization temperatures will range from about 20° to 25° C. up to the boiling point of the lower boiling of the two copolymerizable ingredients.

The halogenated aliphatic unsaturated polycarboxylic acids and polyunsaturated materials are generally combined in molar ratios of from about 1:1 to about 20:1, polycarboxylic acid to polyunsaturated compound, although the invention is in no sense limited to these particular proportions. I prefer using the halogenated acid and polyunsaturated material in a molar ratio of about 2:1 to 4:1.

The copolymerization reaction resulting in the production of my new cation exchange resins may be carried out in aqueous solution or in solution in a suitable polar organic solvent such as, for example, dioxane; aliphatic monohydric alcohols including methanol, propanol, etc.; glycols, i. e., ethylene glycol, diethylene glycol, 2-methyl-2,4-pentanediol, propylene glycol, etc.; aliphatic ketones including dimethyl ketone, methyl ethyl ketone, etc. Generally speaking, any polar organic solvent which is stable in the presence of acid is suitable.

Copolymerization of the unsaturated polycarboxylic acid and polyunsaturated material may also be carried out, if desired, in emulsion or dispersion in an aqueous or non-aqueous medium. In this case, cationic, anionic, or non-ionic surface active agents may be added.

The resins prepared according to the present invention may be cured at from about room temperature (20°-25° C.) to about 150° C. I prefer heating at elevated temperatures, i. e., from 90°-150° C.

It is an advantage of the present invention that the granular water-insoluble synthetic resins produced in accordance therewith are capable of exchanging cations in liquid media and of removing cations from liquid media. In this connection, my resinous materials may be used in admixture with other cation active materials or with inert materials, or they may be used alone. For example, my resins may be applied before gelation to a suitable carrier such as diatomaceous earth, clay, charcoal, etc.

Resinous materials prepared according to my invention are useful in the removal of cations from fluid media, especially from aqueous solutions. The resins may be used in the hydrogen-activated form to remove cations from solutions of bases and salts, and they may also be employed as exchange materials in accordance with the principles applied to the use of the natural and synthetic zeolites. Thus, the resin may be activated with a sodium salt such as sodium chloride, and upon contact with a solution containing calcium, magnesium, or other cations, an exchange of the latter ions for the sodium ions takes place.

The activating solutions or regenerating solutions for my resins are dilute acid solutions or dilute salt solutions, e. g., about 0.2%–20% of sulfuric acid, hydrochloric acid, sodium chloride, potassium chloride, etc.

To be sufficiently insoluble for practical use in the art of water purification, a resin should have a sufficiently low solubility that it will not be dissolved away rapidly by the solution to be treated. Thus, water should not dissolve more than 1 part of resin in 1000 parts of water and preferably should not dissolve more than 1 part of resin in 100,000 parts of water when passed through a bed of resin (after the first cycle comprising an activation, exhaustion, and reactivation of the resin).

It is preferable to grind and screen the resins to a particle size of from about 8–60 mesh. Use of larger particles causes channeling, and smaller particles of resin have been found to pack, thus reducing the cation exchange efficiency of the material.

My resinous materials are useful for a wide variety of purposes. Some of the uses which may be mentioned by way of example are: water purification; purification of glycerol, glycols, etc.;

purification of aqueous solutions containing sugar, including sugar cane juice, sugar beet juice, sugar syrups, etc.; purification of water from lead pipes; removal of heavy metal ions from food, beverages, and pharmaceutical products; decolorization of solutions containing coloring matters, etc. My resins may also be employed to recover valuable metal cations from dilute solutions, e. g., gold from sea water, chromium from chrome tanning liquors, silver from photographic baths, etc. Another important application of my materials is in the absorption or adsorption of gases such as ammonia, the amines, e. g., triethyl amine, methyl amine, etc., from fluid media, either dissolved in a liquid or from vapors. The resins may also be employed as catalysts for many of those reactions normally involving the use of acidic catalysts such as the inversion of sucrose, the conversion of starches to sugars, etc.

I claim:

1. A granular, water-insoluble, cation exchange resin active for the removal of cations from solution, said resin being a copolymer of a mixture consisting of, as sole polymerizable ingredients, (1) chloromaleic anhydride and (2) N,N'-methylenediacrylamide, the molar ratio of (1) to (2) being from 1:1 to 20:1.

2. A process for the preparation of a granular, water-insoluble, cation exchange resin active for the removal of cations from solution which comprises copolymerizing a mixture consisting of, as sole polymerizable ingredients, (1) chloromaleic anhydride and (2) N,N'-methylene diacrylamide, curing the resulting gel, and granulating the cured gel.

JAMES R. DUDLEY.

REFERENCES CITED

The following references are of record in the file of this patent:

UNITED STATES PATENTS

| Number | Name | Date |
|---|---|---|
| 2,173,005 | Strain | Sept. 12, 1939 |
| 2,230,240 | Gerhart | Feb. 4, 1941 |
| 2,340,110 | D'Alelio | Jan. 25, 1944 |
| 2,409,861 | Hunter et al. | Oct. 22, 1946 |
| 2,437,962 | Kropa | Mar. 16, 1948 |
| 2,475,846 | Lundberg | July 12, 1949 |